INVENTOR.
DANIEL G. TAYLOR
BY
ATTORNEY

June 18, 1963     D. G. TAYLOR     3,094,693
VELOCITY SENSING APPARATUS

Filed Dec. 30, 1959     2 Sheets-Sheet 2

INVENTOR.
DANIEL G. TAYLOR
BY
*Warren A. Sturm*
ATTORNEY

United States Patent Office 3,094,693
Patented June 18, 1963

3,094,693
VELOCITY SENSING APPARATUS
Daniel G. Taylor, Minneapolis, Minn., assignor to Minneapolis-Honeywell Regulator Company, Minneapolis, Minn., a corporation of Delaware
Filed Dec. 30, 1959, Ser. No. 862,932
2 Claims. (Cl. 343—7)

This invention relates generally to the field of automatic control of earth working equipment and is more particularly directed to apparatus for determining the relative velocity of an earth working equipment with respect to the surface over which it is traveling.

The prior art contains a number of devices and apparatus for determining the velocity, or speed, of a vehicle with respect to the ground, or surface, over which it is traveling. A familiar example of apparatus of this type is the automobile speedometer which, when greater accuracy is desired, may be supplemented or replaced by a "fifth wheel" that may be used to actuate mechanical or electrical devices to provide an indication of velocity. In the art of earth working, automatic control systems have been developed that require, for proper operation, a source of signal indicative of the relative velocity of a vehicle with respect to the ground. Because of the particular mode of operation generally encountered, namely that of slippage of the traction means with respect to ground, it becomes a necessity to provide apparatus to measure the velocity of the equipment independently of any connection with the tractive means. Further, because of the sometimes violent pitching and rolling motions of the equipment, and of the characteristics of the ground or surface, which may vary from extremely hard material to extremely soft material and from a smooth to an extremely rough surface, it is virtually impossible to obtain an indication of velocity through the use of apparatus that requires direct contact with the ground.

In my invention I provide apparatus for sensing and providing an indication of the relative velocity of the type of vehicle utilized in earth working that provides an accurate indication regardless of various working conditions normally encountered. An application for the apparatus of my invention may be seen in a copending application entitled "Control Apparatus," filed December 30, 1959, Serial Number 862,931, in the name of Robert J. Kutzler now U.S. Patent No. 3,064,371. In this particular copending application, an automatic control system for earth working equipment is provided in which it is necessary to utilize a signal proportional to the slippage of the tractive means of an earth working equipment and, in order to provide this signal, it is necessary to include apparatus for accurately sensing and providing an indication of the velocity of the earth working equipment under normal operating conditions.

It is therefore an object of my invention to provide velocity determining apparatus operable independently of the drive mechanism and tractive means of a motor vehicle that is accurate under all operating conditions.

It is a further object of my invention to provide velocity determining apparatus for use in an automatic control system as utilized in earth working equipment.

These and other objects of my invention will become apparent from a consideration of the appended specification, claims, and drawing, in which:

Figure 1:
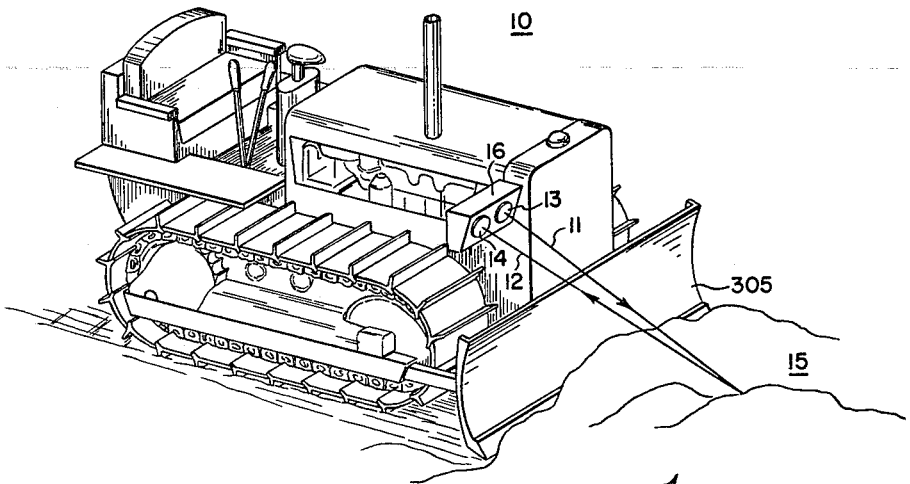
FIGURE 1 is a sketch of an earth working equipment upon which is mounted apparatus embodying the principles of my invention.

Referring now to FIGURE 1, there is shown an earth working equipment, shown generally by reference character 10 as the familiar crawler type tractor, which has mounted thereon an earth working instrumentality, shown in the form of a bulldozer blade 305. Mounted near the top of the left front end of the tractor 10, is an enclosure 16 which contains apparatus to be described below in connection with FIGURES 2 and 3. Mounted on the front of enclosure 16 and at an angle with respect to the surface over which the tractor is traveling are a pair of transducers, 13 and 14. Transducer 13 may be adapted for transmitting a signal indicated by the line 11 which, is reflected from the irregular surface 15 and a reflected component of the transmitted energy, shown by the line 12, is impinging on the receiving transducer 14.

Figure 2:
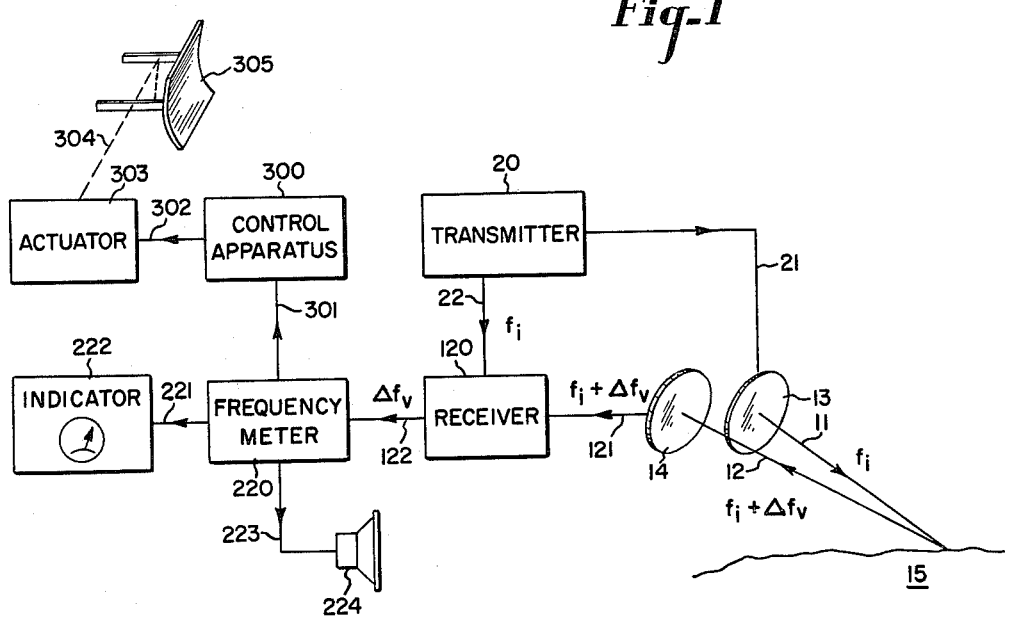
FIGURE 2 is a block diagram of a control system embodying the apparatus of my invention.

FIGURE 2 includes the transmitting transducer 13, the receiving transducer 14, and lines 11 and 12 indicating the direction of travel of the transmitted and reflected signal as shown in FIGURE 1. Transmitting transducer 13 may be energized with a signal of predetermined frequency from transmitter 20 through a lead 21. A receiver 120 is connected to receiving transducer 14 through lead 121 and also to transmitter 20 through a lead 22. The output of receiver 120 is connected to a frequency meter 220 through a lead 122. The output of frequency meter 220 is connected to a loud speaker 224 through lead 223, to an indicator 222 through a lead 221 and to control apparatus 300 through lead 301. Control apparatus 300 is connected to an actuator 303 through a lead 302 and actuator 303 is connected to position earth moving instrumentality 305 through driving means 304.

For purposes of illustration only, it may be assumed that the control system shown in FIGURE 2 is to be utilized to vary the load imposed on, for an instance, a tractor upon which is carried an earth moving instrumentality 305 such that the movement of the tractor will be at a constant velocity for any given setting of the output of the power plant contained on such tractor. This loading may be varied by positioning the earth moving instrumentality relative to the surface upon which it is operating. In order to do so, a signal indicative of the true velocity of the tractor, or vehicle, with respect to the surface over which it is traveling is obtained through utilization of the apparatus of my invention as follows: the transmitter 20 is energized to provide a continuous signal of a predetermined frequency. This signal is applied to transmitting transducer 13 through lead 21 and is transmitted toward the surface over which the equipment is traveling and in a direction forwardly of same where, at least a component of it is reflected from the surface 15, as indicated by the line and arrow 12; the reflected component will have a frequency differing from the transmitted frequency by an amount proportional to the velocity of the equipment upon which the apparatus is mounted and, would normally be expected to be of a frequency higher than that of the transmitted frequency. This signal of a higher frequency is applied to receiver 120 through lead 121 which is also connected to transmitter 20 through lead 22. The transmitted signal and the received reflected signal may be combined in such a manner in the receiver so as to cancel out the transmitted signal and leave only the difference frequency between the transmitted and received signals. The difference in frequency between the transmitted and reflected signal, or here the difference frequency, is proportional to the velocity of the tractor and, as will be recognized by one skilled in the art, is a phenomenon occurring by virtue of the well known Doppler effect. The difference frequency, or increase in frequency, is applied to a frequency meter 220 through lead 122 wherein it is converted to a signal that is proportional to frequency and may be used to drive an indicator 222 through lead 221 to provide a visual indication of velocity, drive a loudspeaker 224 through lead 223 to provide an oral indication of velocity and may be applied to control apparatus 300 through lead 301 to provide a control signal that is utilized to vary the load imposed on the tractor through repositioning of the earth moving instrumentality 305 such that a constant velocity is obtained.

Figure 3:
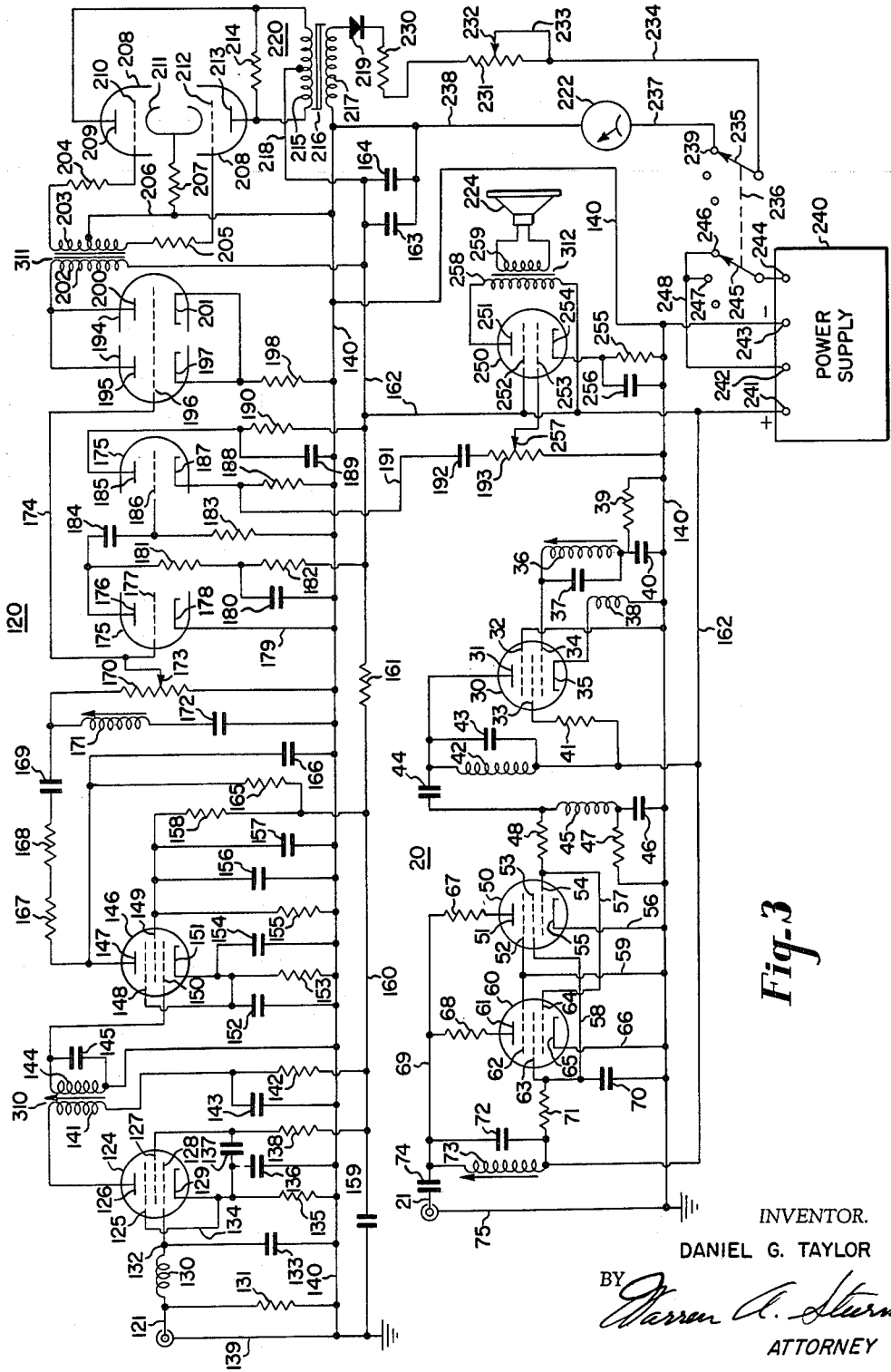
FIGURE 3 is a schematic diagram of one embodiment of my invention.

Referring now to FIGURE 3, there is shown a receiver 120, a transmitter 20, a frequency meter 220, an indicator 222, a loudspeaker 224, an input lead 121 and an output lead 21. A power supply 240 having a positive terminal 241 and a negative terminal 243 is utilized to energize the apparatus.

Transmitter 20 includes an oscillator 230 and a pair of tubes 50 and 60 connected in parallel as a power amplifier. Oscillator tube 30 includes a plate electrode 31, a suppressor electrode 32, a screen grid electrode 33, a control grid electrode 34 and a cathode 35. Cathode 35 is connected to ground lead 140 through inductance 38. Control grid 34 is connected to ground lead 140 through inductance 36 having a capacitor 37 in parallel therewith and resistance 39 having a capacitor 40 in parallel therewith. Presser grid 32 is directly connected to ground lead 140. Screen grid 33 is connected to positive potential lead 162 through resistor 41. Lead 31 is connected to positive potential lead 162 through inductance 42 having capacitor 43 in parallel therewith. Tubes 50 and 60 include plate electrodes 51 and 61 respectively; suppressor grids 52 and 62 connected to ground lead 140 through lead 59; screen grids 53 and 63 connected together through lead 58, to ground lead 140 through capacitor 70 and to lead 162 through resistor 71; control grids 54 and 64 are connected together through lead 57; and cathodes 55 and 65 are connected to ground lead 140 through leads 56 and 66 respectively. Plate electrodes 51 and 61 are connected to lead 162 through resistors 67 and 68 connected in series with inductor 73 having a capacitor 72 in parallel therewith. Plate electrodes 51 and 61 are also connected to output lead 21 through resistors 67 and 68, lead 69 and capacitor 74. Plate electrode 31 of tube 30 is connected to grid electrodes 54 and 64 through capacitor 44 and resistor 48. The junction of capacitor 44 and resistor 48 is connected to ground lead 140 through inductor 45 and resistor 47 having capacitor 46 in parallel therewith. Output lead 21 is connected to a suitable jack that includes a connection to ground through lead 75.

Receiver 120 includes an RF amplifier tube 124, a detector tube 146, a pair of audio amplifier tubes 175, that is an audio amplifier tube shown as a dual triode 175, a further stage of amplification, shown as a parallel connected dual triode tube 194, a push-pull output stage shown as dual triode tube 208 and a frequency meter circuit shown generally by the reference character 220. Tube 124 includes a plate electrode 126, a suppressor electrode 125, a screen grid electrode 127, a control grid electrode 128 and a cathode 129. Control grid electrode 128 is connected to ground lead 140 through a capacitor 133 and to input lead 121 through inductor 130. Input lead 121 is connected to ground lead 140 through resistor 131. A suitable two-terminal jack is shown connected to input lead 121 and to ground lead 140 through lead 139. Cathode 129 is directly connected to suppressor grid 125 through lead 134 to ground lead 140 through resistor 135 having capacitor 136 in parallel therewith and to screen grid 127 through capacitor 137. Screen grid 127 is connected to a source of positive potential through resistor 138, lead 160, resistor 161, and lead 162 connected to positive terminal 241 and power supply 240. Lead 160 is also connected to ground lead 140 through capacitor 159. Plate electrode 126 is connected to lead 160 through primary winding 141 and transformer 310 and resistor 142 having capacitor 143 in parallel therewith. Tube 146 includes plate electrode 147, suppressor electrode 148, screen grid electrode 149, control grid electrode 150 and cathode 151. Control grid electrode 150 is connected to ground lead 140 through secondary winding 144 and transformer 310 having capacitor 145 in parallel therewith. Cathode electrode 151 is directly connected to suppressor electrode 148 and to ground lead 140 through capacitor 152 having resistor 153 and capacitor 154 in parallel therewith. Screen grid electrode 149 is connected to ground lead 140 through resistor 155 having capacitors 156 and 157 in parallel therewith and to lead 160 through resistor 158. Plate electrode 147 is connected to ground lead 140 through capacitor 166 and to lead 160 through resistor 158. Plate electrode 147 is also connected to ground through resistor 167, resistor 168, capacitor 169, and potentiometer winding 170 having inductor 171 and capacitor 172 in parallel therewith. The lefthand section of dual triode 175 includes plate electrode 176, screen grid electrode 177 and cathode electrode 178 directly connected to ground lead 140 through lead 179. Control grid electrode 177 is connected to wiper 173 and plate electrode 176 is connected to lead 162 through resistor 181 and resistor 182. A capacitor 180 is connected between the junction of resistors 181 and 182 to ground lead 140. The righthand section of dual triode 175 includes plate electrode 185, control grid electrode 186 and cathode 187 connected to ground lead 140 through resistor 188. Control grid electrode 186 is connected to ground lead 140 through resistor 183 and to plate 176 through capacitor 184. Plate electrode 185 is connected to lead 162 through resistor 190 and to ground lead 140 through capacitor 189. Dual triode 194 includes plate electrodes 195 and 200 connected in parallel, a control grid electrode 196 common to both sections of the tube, and parallelly connected cathodes 197 and 201 that are in turn connected to ground lead 140 through resistor 198. Control grid electrode 196 is connected to potentiometer wiper 173 through lead 174. The plate electrodes 195 and 200 are connected to lead 162 through primary winding 202 on transformer 311. Dual triode 208 includes plate electrodes 209 and 213, control grid electrodes 210 and 212 and a common cathode 211 connected to ground lead 140 through resistor 207. Control grid electrodes 210 and 212 are connected to the extremities of center tap secondary 203 and transformer 11 through resistors 204 and 205 respectively. The center tap of secondary winding 203 is connected to ground lead 140 through lead 206. Plate electrodes 209 and 213 are connected across the extremities of a center tapped primary winding 215 of transformer 216 having a resistor 214 in parallel therewith. The center tap of transformer primary winding 215 is connetced to lead 162 through lead 218 and thence to ground lead 140 through parallelly connected capacitors 163 and 164. Secondary winding 217 and transformer 216 is shown with its lefthand end connected to ground lead 240 and its righthand end connected to indicator 222 through asymmetrical conductive device 219, resistor 230, adjustable resistor 231 having a wiper 232 connected to lead 234 through lead 233, wiper arm 235, stationary contact 239 and lead 237 connected to indicator 222. Indicator 222 is also connected to ground lead 140 through lead 238.

An audio output stage includes tube 250 having plate electrode 251, screen grid electrode 252, control grid electrode 253, and cathode electrode 254 connected to ground lead 140 through resistor 255 having capacitor 256 in parallel therewith. Plate electrode 251 is connected to lead of 162 through primary winding 258 of transformer 312. Screen grid electrode 252 is connected to lead 162 and control grid electrode 253 is connected to wiper 257 and potentiometer 193. Potentiometer 193 is connected to ground lead 140 and to cathode electrode 187 of the tube 175 through capacitor 192 and lead 191. Secondary winding 259 of transformer 312 is connected to loudspeaker 224.

Power supply 240 includes terminals 242 and 244 that are utilized for energizing and de-energizing the power supply. Terminal 242 is connected to stationary contacts 247 and 246 through lead 248 and terminal 244 is connected to movable contact 245. Movable contact 245 is connected to movable contact 235 through a connecting means 236 so that the operation of the two switching means may be accomplished in unison. The filaments of the tubes utilized in the apparatus may be energized from a suitable source of energy (not shown).

The following is a table of values of the components utilized in the embodiment of my invention shown in FIGURE 3:

| Reference character: | Value |
|---|---|
| 30 | 6AK6 type vacuum tube. |
| 36 | 300 microhenries. |
| 37 | .012 microfarads. |
| 39 | 47K ohms. |
| 40 | .005 microfarads. |
| 41 | 43K ohms. |
| 42 | 1.75 millihenries. |
| 43 | .002 microfarads. |
| 44 | .01 microfarads. |
| 45 | 30 millihenries. |
| 46 | .1 microfarad. |
| 47 | 10K ohms. |
| 48 | 470 ohms. |
| 50 | 5763 type vacuum tube. |
| 60 | 5763 type vacuum tube. |
| 67 | 100 ohms. |
| 68 | 100 ohms. |
| 70 | .1 microfarad. |
| 71 | 5K ohms. |
| 72 | .01 microfarad. |
| 73 | 350 microhenries. |
| 74 | .1 microfarad. |
| 131 | 22K ohms. |
| 130 | 35 millihenries. |
| 133 | 100 micromicrofarads. |
| 135 | 150 ohms. |
| 136 | .1 microfarad. |
| 137 | .1 microfarad. |
| 138 | 68K ohms. |
| 143 | .1 microfarad. |
| 142 | 1.8K ohms. |
| 145 | 200 micromicrofarads. |
| 124 | Type 6BA6 vacuum tube. |
| 146 | Type 6AU6 vacuum tube. |
| 152 | .1 microfarad. |
| 153 | 27K ohms. |
| 154 | 20 microfarad. |
| 155 | 10K ohms. |
| 156 | .1 microfarad. |
| 157 | 10 microfarad. |
| 158 | 100K ohms. |
| 159 | 40 microfarads. |
| 165 | 100K ohms. |
| 166 | .0005 microfarad. |
| 167 | 22K ohms. |
| 168 | 22K ohms. |
| 169 | .1 microfarad. |
| 171 | 3.5 millihenries. |
| 172 | .001 microfarad. |
| 170 | 1 megohm. |
| 175 | Type 12AT7 vacuum tube. |
| 180 | 30 microfarads. |
| 181 | 100K ohms. |
| 182 | 47K ohms. |
| 183 | 2.2 megohms. |
| 184 | .1 microfarad. |
| 188 | 47K ohms. |
| 189 | 10 microfarad. |
| 190 | 47K ohms. |
| 194 | Type 12AT7 vacuum tube. |
| 198 | 680 ohms. |
| 161 | 2.7K ohms. |
| 192 | .1 microfarad. |
| 193 | 1 megohm. |
| 163 | 40 microfarads. |
| 164 | 10 microfarads. |
| 204 | 270 ohms. |
| 205 | 270 ohms. |
| 207 | 82 ohms. |
| 208 | Type 12AT7 vacuum tube. |
| 214 | 39K ohms. |
| 220 | Airpax mag meter model F-980. |
| 231 | 100 ohms. |
| 255 | 680 ohms. |
| 256 | 20 microfarads. |
| 13 | Barium titanate. |
| 14 | Barium titanate. |

*Operation of FIGURE 3*

In considering the operation of FIGURE 3 it may be assumed that transmitting transducer 13 is connected to lead 21 on the output of transmitter 20 and receiving transducer 14 is connected to lead 121 on the input of receiver 120. The system may be energized by placing movable contacts 245 and 235 in the position shown in the drawing of FIGURE 3. The output of oscillator tube 30 and transmitter 20 may be of a value of approximately 81.25 kilocycles and is applied through parallel connected power amplifier tubes in the transmitter 20 to the output lead 21 and thence to transmitting transducer 13. As shown in FIGURE 2, the output of transducer 13 may be represented by line 11 and consists of a beam of energy of the transmitted frequency that is positioned so that a portion of it will be reflected from the surface 15 which is indicated by the line 12 which impinges upon receiving transducer 14 where the reflected signal, consisting of mechanical oscillations, or ultrasonic energy, is converted back to electrical oscillations and applied to the input lead 121 of receiver 120. A direct connection, 22, is shown between the transmitter and receiver in FIGURE 2 that is not shown in FIGURE 3 due to the observed condition that there is transmitted directly from transmitter 13 to receiver 14 enough of the transmitted signal frequency which may be combined with the reflected signal in the receiver without providing a direct connection. The received signal including the reflected signal of an increased frequency and the transmitted signal of 81.25 kc. is amplified in tube 124 of receiver 120 and applied to the input of a demodulator tube 146 operating as a plate detector. The output of tube 146 consists substantially of the difference frequency between the transmitted frequency and the reflected received signal. The output of detector 146 appears across potentiometer winding 170 and is applied, through potentiometer wiper 173, to a visual indicating circuit and to an oral indicating circuit. The visual indicating circuit provides an indication on indicating means, or meter, 222 proportional to the difference in frequency between the transmitted and reflected signal. An oral indication may be obtained from loudspeaker 224, the output of which will vary in frequency in accordance with the difference in frequency between the transmitted and reflected signal to provide the operator with further indication of the velocity of the earth moving equipment with respect to the surface over which it is traveling.

With the apparatus shown, it has been determined that with a transmitted frequency of 81.25 kilocycles, and with the transducers inclined 45° from horizontal, a frequency difference between the transmitted and received signal of 1025 cycles per second is obtained for a velocity of movement of the earth moving equipment of 10 feet per second.

It may be noted that the output of frequency determining device 220 is a D.C. signal of varying amplitude proportional to the applied frequency of the difference between the transmitted and reflected signal and may therefore be connected to further control apparatus, as shown in FIGURE 2, to provide a signal proportional to the velocity of the earth working equipment relative to the surface over which it is traveling. Normally, the velocity signal may be utilized as it is obtained from frequency determining apparatus 220, however, where the earth working equipment is subject to a violent pitching and rolling operation, it may be desirable to provide an integrating means to provide an average velocity or, where higher accuracy is desired under the somewhat violent conditions, a means for stabilization of the transmitting and receiving transducers may be resorted to.

Various modifications of the embodiments shown in this application may occur to those skilled in the art and it is therefore my intention to be limited only by the scope of the appended claims.

I claim:

1. In combination: an earth moving apparatus having tractive means to move said apparatus and having a movable earth working instrumentality to engage and to work the earth over which the apparatus moves; means for sensing the velocity of said apparatus with respect to the earth over which it moves having transmitter means and receiver means mounted upon said earth moving apparatus, said transmitter means including means directed downwardly toward the earth toward which said apparatus is moving and providing a signal of predetermined frequency which is directed toward the earth toward which said apparatus is moving, said receiver means including means directed downwardly toward the earth toward which said apparatus is moving to receive a reflected signal of varying frequency which is reflected from the earth toward which said apparatus is moving, and having further means connected to said receiver means and responsive to the difference between said signal of predetermined frequency and said reflected signal of varying frequency to provide a further signal proportional to the velocity of said earth moving apparatus; and means controlled by said further means to control the position of said earth working instrumentality.

2. In combination: an earth moving vehicle having tractive means and having a movable earth moving instrumentality engaging the earth to effect slippage of the vehicle tractive means due to the load imposed as the earth is moved; vehicular mounted transmitting and receiving means having means directed toward the earth toward which said vehicle is moving and operable to transmit a signal of predetermined frequency in a downward direction to the earth toward which the vehicle is moving and to receive two signals including a first of said predetermined frequency and a second signal of a second frequency which is reflected from the earth toward which said vehicle is moving; means connected to said receiver means for providing a further signal indicative of the velocity of the vehicle, said further signal being proportional to the difference in frequency between said first and second signals; and means controlled by said last-named means to move said earth moving instrumentality to thereby control the load and thus the slippage of the vehicle tractive means.

References Cited in the file of this patent
UNITED STATES PATENTS

| | | |
|---|---|---|
| 2,804,160 | Rashid | Aug. 27, 1957 |
| 2,865,019 | Harrison | Dec. 16, 1958 |